(No Model.)

J. L. HALL & F. H. CHASE.
FRUIT PITTER.

No. 535,333. Patented Mar. 5, 1895.

WITNESSES:
Fred G. Dieterich
Amos W. Hart

INVENTORS:
James L. Hall,
Frank H. Chase
BY Munn & Co.
ATTORNEYS.

UNITED STATES PATENT OFFICE.

JAMES L. HALL, OF KINGSTON, MASSACHUSETTS, AND FRANK HOWARD CHASE, OF GRAND RIVERS, KENTUCKY; SAID CHASE ASSIGNOR TO SAID HALL.

FRUIT-PITTER.

SPECIFICATION forming part of Letters Patent No. 535,333, dated March 5, 1895.

Application filed June 2, 1894. Serial No. 513,337. (No model.)

*To all whom it may concern:*

Be it known that we, JAMES L. HALL, of Kingston, in the county of Plymouth and State of Massachusetts, and FRANK HOWARD CHASE, of Grand Rivers, in the county of Livingston and State of Kentucky, have invented a new and useful Improvement in Fruit-Pitters, of which the following is a specification.

Our present invention is an improvement upon the raisin-seeder or pitter for which Letters Patent No. 496,734 have been granted to us.

The improvement consists in an attachment of said seeder which is in the nature of a ring, encircling the spring prongs of the seeder and subserving the two-fold function of a guard or retainer that prevents the heads of the prongs spreading or expanding laterally, as well as increases the effectiveness of the seeder in that it practically takes the place of a row or circlet of prongs.

The details of construction and arrangement of parts embodying such improvement are as hereinafter described and shown in accompanying drawings, in which—

Figure 1:
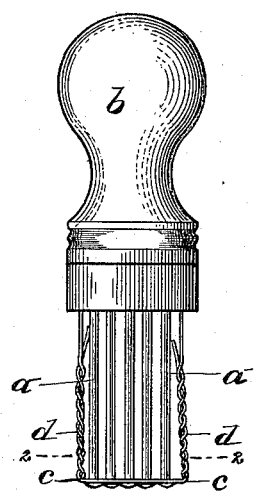
Figure 2:
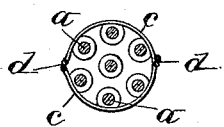
Figure 3:
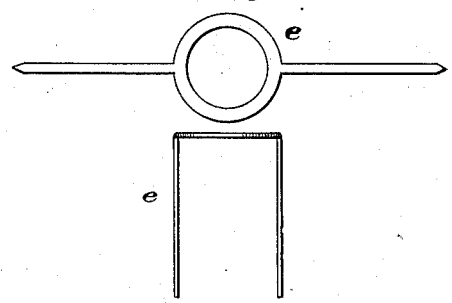

Figure 1 is a side view of our improved fruit-pitter. Fig. 2 is a cross-section of the same on line 2—2 of Fig. 1. Fig. 3 shows a modification of the "guard."

A series of elastic prongs, $a$, is set in one end of a suitable handle, $b$, and provided with enlarged heads which are slightly conical in form. The prongs, $a$, are preferably arranged parallel to each other as shown but they may be set slightly convergent. In using the device, the raisins to be seeded are spread upon a table or other hard surface, and the device being held vertically in the hand, it is forced down upon them so that the heads of the prongs or fingers pierce through the skin and pulp of the fruit, while the seeds of the same pass between the heads of the prongs into the spaces between the shanks of the latter, where they are held until forcibly removed or discharged. This last result may be attained by holding the device horizontally and jarring it by contact with some object, or more effectively by means of a thin-pointed tool inserted between the prongs.

Our improved attachment or "guard" is a ring, $c$, which encircles the prongs, $a$, close to or in contact with their heads. We may employ the attachment under several forms, the preferred one being shown in Fig. 1, and consisting of a wire ring having two parallel supports or legs, $d$, which are fixed in the handle, $b$, parallel to the prongs, $a$. We prefer to make this form of guard of two small wires which are twisted together to form the legs, $d$, and are separated and bent outward at the middle of their length, in opposite directions, and at right angles to said legs to form a ring, $c$. The latter is out of contact with the outer row or circlet of prongs, $a$, and the legs, $d$, support it firmly in position. The guard thus serves to prevent any undue lateral spread or expansion of the outer row or series of prongs, so that when their heads are forced into the fruit there is no failure to take up and retain any seeds with which the said heads come in contact. The guard also aids in cutting the pulp of the fruit and extracting and retaining seeds, which the heads of the prongs would not, so that it virtually performs the function of an additional row or circlet of prongs.

The guard may be made of an integral piece, $e$, as shown in Fig. 3, which represents the same in the flat and also bent into its permanent form. It is cut out of a piece of sheet metal and the legs then bent parallel as shown.

What we claim is—

1. In a fruit-pitter or seeder, the combination with a series of prongs having enlarged heads, and a handle in which the prongs are fixed, of a "guard" which consists of a ring encircling the prongs contiguous to their heads, and allowing slight expansion of the prongs, and a support for said ring which is fixed in the handle, substantially as shown and described.

2. In a fruit-pitter or seeder, the combination with a series of elastic prongs having enlarged heads, and a handle in which they are fixed parallel or nearly so, of a "guard" or attachment composed of a ring that loosely encircles the ends of the prongs, and two legs which are integral with said ring and arranged opposite each other and fixed in the handle, as shown and described.

3. In a fruit-pitter or seeder, the combination with a series of elastic headed prongs and handle in which they are fixed, of a device combining the functions specified the same being formed of wires twisted together to form the two legs or supports and separated and bent outward oppositely in the same plane at right angles to said legs, as shown and described.

JAMES L. HALL.
FRANK HOWARD CHASE.

Witnesses to the signature of Hall:
CHAS. HALL ADAMS,
LEANDER M. CLARK.

Witnesses to the signature of Chase:
J. MARKS,
W. W. ENNIS.